US010752146B2

(12) United States Patent
Renger et al.

(10) Patent No.: US 10,752,146 B2
(45) Date of Patent: Aug. 25, 2020

(54) VEHICLE WITH A TILTABLE MATERIAL COLLECTING CONTAINER AS WELL AS AN EMPTYING MODULE

(71) Applicant: RSP GMBH, Saalfeld (DE)

(72) Inventors: Marina Renger, Saalfelder Hoehe (DE); Karl-Heinz Renger, Saalfelder Hoehe (DE); Jens Graber, Saalfelder Hoehe (DE)

(73) Assignee: RSP GMBH, Saalfeld (DE)

( * ) Notice: Subject to any disclaimer, the term of this patent is extended or adjusted under 35 U.S.C. 154(b) by 82 days.

(21) Appl. No.: 16/090,518

(22) PCT Filed: Mar. 21, 2017

(86) PCT No.: PCT/EP2017/056740
§ 371 (c)(1),
(2) Date: Oct. 1, 2018

(87) PCT Pub. No.: WO2017/167609
PCT Pub. Date: Oct. 5, 2017

(65) Prior Publication Data
US 2019/0111825 A1 Apr. 18, 2019

(30) Foreign Application Priority Data
Mar. 31, 2016 (DE) .................. 10 2016 105 849

(51) Int. Cl.
B60P 1/16 (2006.01)
B60P 1/34 (2006.01)
(Continued)

(52) U.S. Cl.
CPC .............. B60P 1/165 (2013.01); B60P 1/34 (2013.01); E02F 3/8816 (2013.01); E02F 3/90 (2013.01)

(58) Field of Classification Search
CPC .. B60P 1/165; B60P 1/034; B60P 1/28; B60P 1/283; B60P 1/286
(Continued)

(56) References Cited

U.S. PATENT DOCUMENTS 1,732,461 A * 10/1929 Cummings et al. ...... B60P 1/14
298/18
1,831,489 A * 11/1931 Flowers .................. B60P 1/165
298/17.7
(Continued)

FOREIGN PATENT DOCUMENTS

DE 28 11 186 A1 9/1978
DE 38 37 670 A1 5/1990
(Continued)

OTHER PUBLICATIONS

English translation of International Preliminary Report on Patentability dated Oct. 2, 2018, issued in connection with corresponding International Application No. PCT/EP2017/056883 (8 pages total).
(Continued)

Primary Examiner — Tara Mayo-Pinnock
(74) Attorney, Agent, or Firm — Stuart H. Mayer; Mayer & Williams PC

(57) ABSTRACT

The invention relates to a vehicle comprising a tiltable material collecting container which is suspended in a tilt axle running parallel to the longitudinal axis of the vehicle and a telescoping device. The tilt axle runs in a plane of symmetry of the material collecting container. The frame-side ends of the telescope arms are pivotably attached to the frame in the central plane. At least one rotary drive is arranged on the container-side end of at least one telescope arm (09) to enable a rotation of the material collecting container about the tile axle. At least one pivot drive, which
(Continued)

enables pivoting of the telescope arms out of the center plane of the vehicle in both angular directions, is provided.

19 Claims, 3 Drawing Sheets

(51) Int. Cl.
*E02F 3/88* (2006.01)
*E02F 3/90* (2006.01)

(58) Field of Classification Search
USPC .............................. 37/431, 432; 298/13, 18
See application file for complete search history.

(56) References Cited

U.S. PATENT DOCUMENTS

| | | | | |
|---|---|---|---|---|
| 2,072,998 | A * | 3/1937 | Allin | B60P 1/165 298/17.6 |
| 2,530,613 | A * | 11/1950 | Hopper | B60P 1/165 298/18 |
| 2,694,599 | A * | 11/1954 | Porter et al. | B60P 1/165 298/17.7 |
| 3,238,897 | A * | 3/1966 | Flowers | B60P 1/26 105/276 |
| 3,424,498 | A * | 1/1969 | Maxon, Jr. | B60P 1/34 298/7 |
| 3,753,593 | A * | 8/1973 | Wells et al. | A01D 90/00 298/10 |
| 3,844,617 | A * | 10/1974 | Kostman | A01D 90/12 298/11 |
| 3,930,324 | A | 1/1976 | Wightman et al. | |
| 4,062,664 | A | 12/1977 | Dupre et al. | |
| 4,200,334 | A | 4/1980 | Lindholm | |
| 4,494,798 | A * | 1/1985 | Bailey | B60P 1/165 105/271 |
| 5,333,969 | A | 8/1994 | Blaha et al. | |
| 5,480,214 | A * | 1/1996 | Rogers | B60P 1/165 296/183.2 |
| 6,089,670 | A | 7/2000 | Rogers | |
| 6,199,955 | B1 * | 3/2001 | Rogers | B60P 1/165 298/18 |
| 2009/0195052 | A1 * | 8/2009 | Rogers et al. | B60P 1/165 298/18 |
| 2009/0200500 | A1 * | 8/2009 | Rogers | B60P 1/165 251/129.04 |
| 2009/0200853 | A1 * | 8/2009 | Rogers et al. | B60P 1/165 298/22 R |
| 2010/0196129 | A1 | 8/2010 | Buckner | |
| 2012/0007410 | A1 * | 1/2012 | Rogers et al. | B60P 1/165 298/17.6 |

FOREIGN PATENT DOCUMENTS

| | | |
|---|---|---|
| DE | 295 08 516 U1 | 8/1995 |
| DE | 299 02 562 U1 | 8/1995 |
| DE | 198 51 111 C1 | 12/1999 |
| DE | 10 2011 119 924 A1 | 6/2013 |
| DE | 10 012 003 226 A1 | 8/2013 |
| DE | 10 2014 103 604 B3 | 9/2014 |
| EP | 0 337 678 A2 | 10/1989 |
| EP | 0 368 129 B1 | 8/1993 |
| JP | H08326095 A | 12/1996 |
| WO | 00/28159 A1 | 5/2000 |
| WO | 00/47831 A1 | 8/2000 |
| WO | 2013/079671 A1 | 6/2013 |
| WO | 2013/124287 A4 | 8/2013 |

OTHER PUBLICATIONS

English translation of International Preliminary Report on Patentability dated Oct. 2, 2018, issued in connection with corresponding International Application No. PCT/EP2017/056740 (8 pages total).
English translation of International Search Report dated Jun. 20, 2017, issued in connection with corresponding International Application No. PCT/EP2017/056740 (2 pages total).
English translation of International Search Report dated Jun. 28, 2017, issued in connection with corresponding International Application No. PCT/EP2017/056883 (3 pages total).

* cited by examiner

VEHICLE WITH A TILTABLE MATERIAL COLLECTING CONTAINER AS WELL AS AN EMPTYING MODULE

FIELD

The present invention relates to a vehicle having a vehicle frame with a vehicle longitudinal axis running in a central plane of the vehicle. The vehicle also has a tiltable material collecting container which is suspended from a tilt axle running parallel to the longitudinal axis of the vehicle. Finally, the vehicle has a telescoping device having two telescope arms, each container-side end being arranged on the tilt axle, about which the material collecting container can thus be rotated, wherein the frame-side end of each telescope arm is arranged on the vehicle frame. The unit comprising the material collecting container and its storage and actuating elements can preferably be designed in the form of an emptying module, which can be operated either on the vehicle or in stationary operation as needed without the vehicle. Therefore the present invention also relates to such an emptying module.

BACKGROUND

In conjunction with trucks and commercial vehicles, it is known that superstructures, which are to some extent adapted to the mobile use case, must be installed on the so-called vehicle chassis for the respective intended purpose. Such superstructures are connected to the vehicle frame, and in certain use cases, the main vehicle drive is also used as the drive for accessory functions of the unit, but these superstructures can occasionally also be operated independently of the vehicle. For example, trucks for bulk materials which have a receiving container for material are known, such that the receiving container is tilted about a tilt axle for unloading the bulk material, so that the bulk material runs out of the container by gravity. In this context, there are also known embodiments of trucks having a tilt axle running in the longitudinal direction of the vehicle, sometimes even equipped with two tilt axles in order to be able to dump the bulk material on either side of the vehicle. The tilt axles running in the longitudinal direction are usually arranged as close as possible to the outside edge of the vehicle frame, so that it is possible to dump the load directly next to the vehicle.

So-called suction dredges are a special case of an application in the field of mobile work machines.

DE 38 37 670 A1 discloses such a suction dredge comprising a pneumatic suction blow pipe, a collecting container for the soil sucked into it with the suction blow pipe opening therein, and the soil from the suction air stream being deposited therein as well as a suction fan connected to the collecting container to generate the suction air stream. The additional conventional components of a suction dredge include guide elements for the suction blow pipe and filters for cleaning the suction air before it leaves the collecting container and is discharged to the surroundings. With the design of the suction dredge described in this document, a collecting tank which can be tilted about one of two tilt axes running in the longitudinal direction of the vehicle toward the respective side of the vehicle as an alternative to dump the material deposited in the collecting container. The tilting arrangement used for this corresponds largely to the design of dump trucks with tipping buckets. One disadvantage of such a design for tipping the collecting container at the side is that the material in the bucket then falls to the ground directly next to the vehicle and when large volumes of materials are involved, this may make it difficult to completely empty the material collecting container in just one tilting operation. Therefore, the vehicle must either be moved during the tilting process or the dumping of material must take place in an area at a lower level in order to be able to receive larger volumes of material in this way.

DE 10 2012 003 226 A1 discloses a tiltable container, in particular for suction dredges in which the tilt axle is arranged above the container bottom, preferably in the upper half of the container. To empty the container, it can first be raised by means of a hydraulic system and then shifted to the side so that the tilt axle is raised into an elevated position. Another linear drive then acts on the container to pivot it about the tilt axle. Before the emptying process, a cover placed on the container must be opened by means of its own hydraulic system and pivoted to the side to allow the container to be raised and tilted. The design of this suction dredge is complicated, high maintenance and expensive accordingly. Furthermore, the known suction dredge has the significant disadvantage that the container can be tilted to only one side of the vehicle, so that flexible use of the suction dredge is greatly restricted.

DE 28 11 186 A1 describes a transport container, which is arranged on a running gear and can be tilted by means of a tilting device transversely to the longitudinal axis of the vehicle. The two front end walls of the container are arranged so that each can be pivoted about a bearing journal. The bearing journal is connected to the upper ends of a trestle which has two pivot arms each pointing to a longitudinal axis of the running gear. The pivot arms are releasably connected to the running gear such that only the two pivot arms in the direction of which the container is to be emptied are connected to the running gear via bearing bolts while the two other pivot arms must be released manually from the running gear. Hydraulic working cylinders which are connected at the lower ends at the center of the transverse beam and at their upper end to a strap rigidly connecting the pivot arms are used to tilt the container. A circular disk on which a cable acts is arranged concentrically on the bearing journal.

With such known approaches to emptying a collecting tank, the movements for raising and tilting are necessarily separate from one another, thus resulting in a fixed movement sequence and a fixed tilting sequence. The height of tilting cannot be altered and the lateral tilting width is also fixed. For example, this results in the disadvantage that some of the bulk material will land on the vehicle chassis unless separator deflectors or guards are provided. Furthermore, conversion components must be designed manually to be tiltable on both sides.

Starting from the documents cited above, the object of the present invention is to provide an improved vehicle with a tiltable material collecting container which allows the material collecting container to be tilted to either side of the vehicle while at the same time permitting a position of the tilt axle, which is variable in height and about which it is possible to empty the material collecting container, even on an elevated surface, for example, another vehicle at the side, and it makes do with proven and robust drive elements.

These and other objects are achieved by a vehicle having the features according to the accompanying claim 1.

SUMMARY

Important advantages of the invention consist of the fact that, among other things, it is possible to extend, tilt and rotate the collecting container toward both sides of the vehicle without requiring retrofitting. Since lifting and tilting movements can be controlled independently of one another, different tilt positions of the container are made possible by the present invention so that the use conditions are more flexible. Furthermore, it is possible for the first time to pivot the collecting container so far to the side that the tilt axle is outside of the base of the vehicle so that the vehicle chassis is no longer soiled by the bulk material during the dumping process.

The vehicle according to the invention is characterized in that, among other things, the tilt axle runs parallel to a plane of symmetry of the material collecting container wherein the lateral offset relative to the plane of symmetry amounts to less than $\frac{1}{8}$, preferably less than $\frac{1}{12}$ of the width of the material collecting container. The tilt axle especially preferably runs in the plane of symmetry of the material collecting container which encloses the longitudinal axis of the vehicle in a resting state, a working state or a transport state. The material collecting container is designed to be essentially symmetrical in its longitudinal axis, in particular with regard to load distribution. A symmetrical design in the sense of the present invention may be assumed if the material collecting container is automatically pivoted into a position in which the center plane runs essentially at a right angle, and, in the case of suspension along the tilt axle and without using other fastening elements or bearing elements, the top side of the material collecting container runs essentially in a horizontal plane. Those skilled in the art will recognize the fact that a design is also symmetrical in the sense when additional elements for example elements required for fastening or other secondary functions are mounted on only one side of the material collecting container and to this extent there is no strictly geometric symmetry.

In addition, the vehicle according to the invention is characterized in that the frame-side ends of the telescope arms are preferably attached pivotably to the vehicle frame, especially preferably in the center plane of the vehicle or at only a slight lateral offset therefrom in the amount of less than $\frac{1}{8}$, preferably less than $\frac{1}{12}$ of the width of the material collecting container. As a result, the telescope arms stand essentially at a right angle in a resting state or a transport state, i.e., when the material collecting container is not tilted, and the telescope arms also run in the center plane of the vehicle. This also has the advantage that the force of weight in this resting state, working state and transport state emanating from the material collecting container and the material therein acts in the axial direction on the telescope arms which can absorb high forces in this direction as long as the material collecting container is not deposited on the frame.

In addition, the vehicle according to the invention has at least one rotary drive on the container side end of at least one of the telescope arms. The rotary drive acts on the material collecting container to rotate it about the tilt axle for an emptying operation. In this way it is possible to omit linear drives that act separately between the material collecting container and the vehicle frame. In a preferred embodiment, two rotary drives may be used, each being located on a container side end of the two telescope arms, to apply greater forces and to achieve smooth running.

Finally, the vehicle according to the invention has at least one pivot drive, which enables pivoting of the telescope arms out of the center plane of the vehicle in both angular directions. The pivot drive may be embodied by hydraulic cylinders for example which act between the vehicle frame and the section of the telescope arm that is not variable in length. In alternative embodiments, the pivot drive may also be designed as a conditional rotary drive, which preferably acts on the frame-side end of the two telescope arms. Likewise, the pivot drive can use other linear drives, which optionally act in opposition to allow pivoting in both side directions of the vehicle.

According to a particularly preferred embodiment, the vehicle is a suction dredge. In this case, it is especially expedient if the connection for the suction hose is provided on the material collecting container in such a way that the material being sucked in is arranged essentially symmetrically so that the load distribution in the material collecting container is also essentially symmetrical, regardless of the filling level. In modified embodiments, the inside space of the material collecting container may also be subdivided and many have a plurality of chambers in which different materials may be accommodated as needed. In yet other modified embodiments, the vehicle may also be equipped for other material collecting purposes, for example, to receive sludge or mud or liquids.

It is advantageous if the tilt axle runs through two pivot bearings, which are situated on the end walls of the material collecting container running transversely to the direction of travel. These pivot bearings are especially preferably arranged on the end walls in the upper half of the material collecting container, so that the tilt axle is already substantially above the vehicle frame in the resting state, for example, at a height of approximately 2 meters to 3 meters above the plane of the road surface. In a simple embodiment, one of the pivot bearings may be embodied as a journal bearing.

In a modified embodiment, the pivot bearings are combined with a ball and socket joint acting in the axial direction so that in extension of the telescope arms in particular there may be a height offset between the opposing pivot bearings without resulting in blockage of the pivot bearing. If the pivot bearings refined in this way and the rest of the design make it possible to adjust such a height offset in a targeted manner, then the tilt axle can be inclined in the longitudinal direction with respect to the vehicle frame, so that in the case of a vehicle at an inclination, for example, virtually horizontal tilting of the material collecting container is nevertheless possible, or in a modified case, displacement of the material collecting container with respect to the horizontal can be carried out in a targeted manner, for example, in order to allow liquid or pasty media to run out on only one side of the material collecting container.

An expedient embodiment is characterized in that the material collecting container is closed by a cover at its top surface which is opened by emptying. To do so, the cover preferably has two cover parts which are mounted on a folding axle situated in or close to the plane of symmetry of the material collecting container. When the material collecting container is tilted, the half of the cover toward which the material collecting container is tilted is preferably opened by opening elements when the material collecting container is tilted. It is advantageous if closing and locking elements are also provided to tightly close the cover during suction operation, so that the pressure conditions in the material collecting container will conform to the requirements of a suction dredge.

In a preferred embodiment, the telescope arms are designed so that the difference in length between the completely retracted state and the completely extended stated corresponds to at least $\frac{1}{4}$, preferably approximately $\frac{1}{2}$ of the height of the material collecting container. This ensures that the material collecting container can be raised far enough so that no other parts of the vehicle will be damaged in the subsequent tilting. At the same time extending the telescope arms to a sufficient extent ensures that it will still be possible to empty the material collecting container at a higher level.

The lateral pivoting of the telescope arms should be possible at least to the extent that the material collecting container can be safety tilted on the respective side of the vehicle without the vehicle being damaged or being hindered in driving further due to the material that has fallen out of the container. The telescope arms can preferably be pivoted so far to each side of the vehicle that the tilt axle, projected onto the plane of the vehicle frame, runs outside of the base area described by the vehicle frame.

The aforementioned object is also achieved by an emptying module such as that defined in claim 9. This emptying module may be mounted as an independent module on a vehicle or it may also be used in stationary operation. In particular, the module-type design makes it possible to mount the emptying module on various types of vehicles, depending on the desired application case.

BRIEF DESCRIPTION OF THE DRAWINGS

Additional details advantages and refinements of the present invention are derived from the following description of a preferred embodiment with reference to the drawings in which.

DETAILED DESCRIPTION

Figure 1:
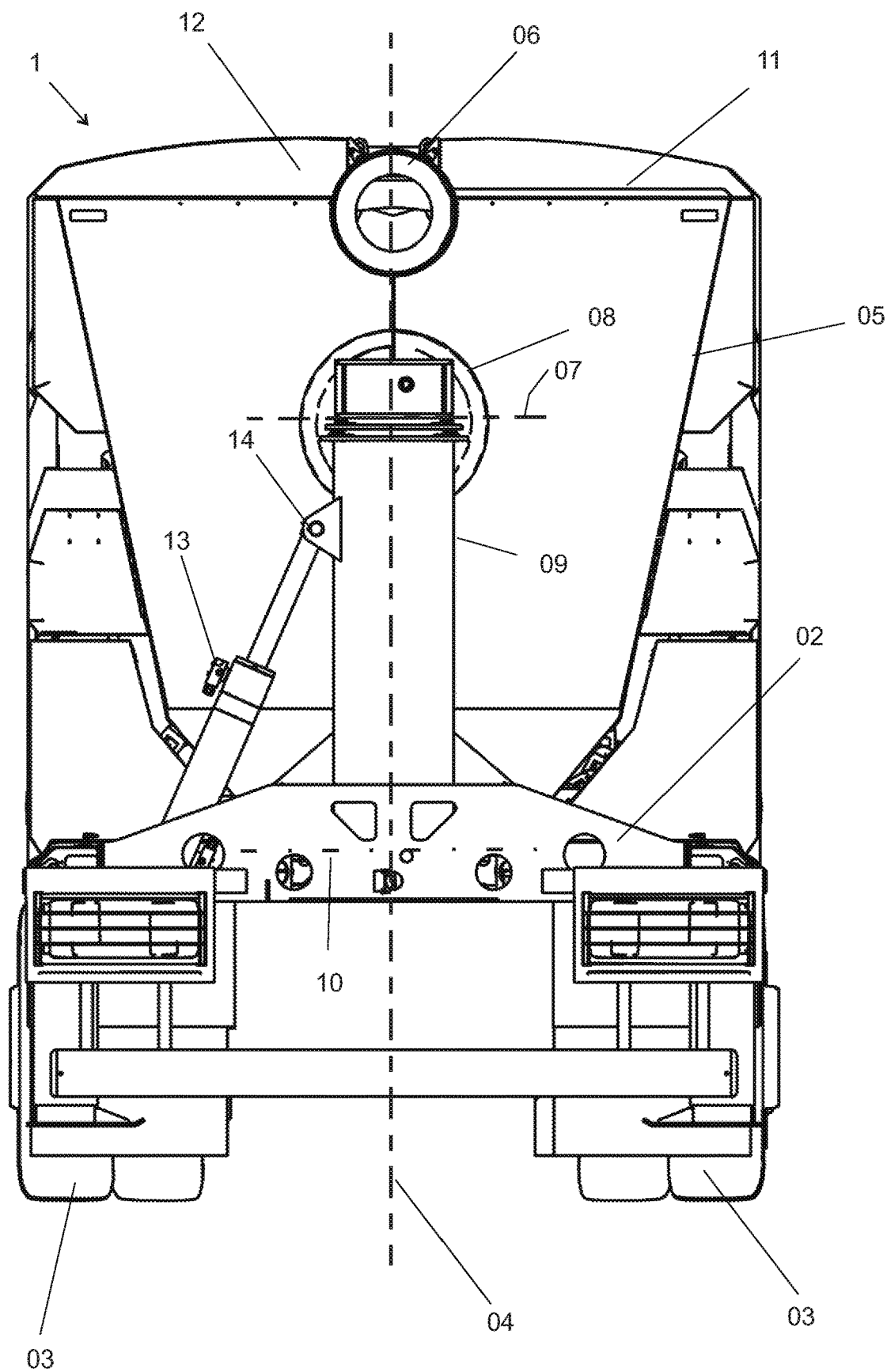
FIG. 1 shows a simplified view of a vehicle from the rear, comprising a tiltable material collecting container.

FIG. 1 shows a simplified view from the rear of a vehicle 01, which in this case is a suction dredge wherein various details of the suction dredge are not shown because they are not of particular interest for the present invention. The vehicle 01 has a vehicle frame 02. With respect to vehicle wheels 03, the vehicle is designed symmetrically with a center plane 04 of the vehicle, represented by a dash-dot line in FIG. 1. A vehicle longitudinal axis 04a runs in the center plane of the vehicle. As an add-on element the vehicle 01 has an emptying module with a material collecting container 05, in which the material sucked up by the suction dredge is collected. In this application case a suction hose is connected to a suction connection 06, with the material to be sucked in being supplied to the material collecting container through said suction hose.

The material collecting container 05 is suspended in a tilt axle 07, the course of which is defined by two pivot bearings 08 which are situated on the end walls of the material collecting container 05 running transversely to the direction of travel of the vehicle.

In the embodiment shown here a telescoping device comprises two telescope arms 09, each of whose container-side ends is coupled to one of the pivot bearings 08, and each of whose frame-side ends is mounted pivotably on a pivot bearing 10 on the vehicle frame 02.

As indicated in FIG. 1, the material collecting container 05 is positioned essentially centrally over the vehicle frame and/or an auxiliary frame 02 during a resting position, transport position or working position. A top side 11 of the material collecting container 05 in this state runs essentially horizontally. The top side 11 is closed by a cover 12. The telescope arms 09 are essentially perpendicular to the plane of the vehicle frame 02.

A hydraulic cylinder 13 that works as a pivot drive extends between the vehicle frame 02 and a hinge point 14 on the section of the respective telescope arm 09 that is not variable in length. The pivot drive 13 is designed so that, with its activation, it can pivot the telescope arm 09 to the right or left in both angular directions out of the vertical position, i.e., out of the central plane 04 of the vehicle.

Figure 2:
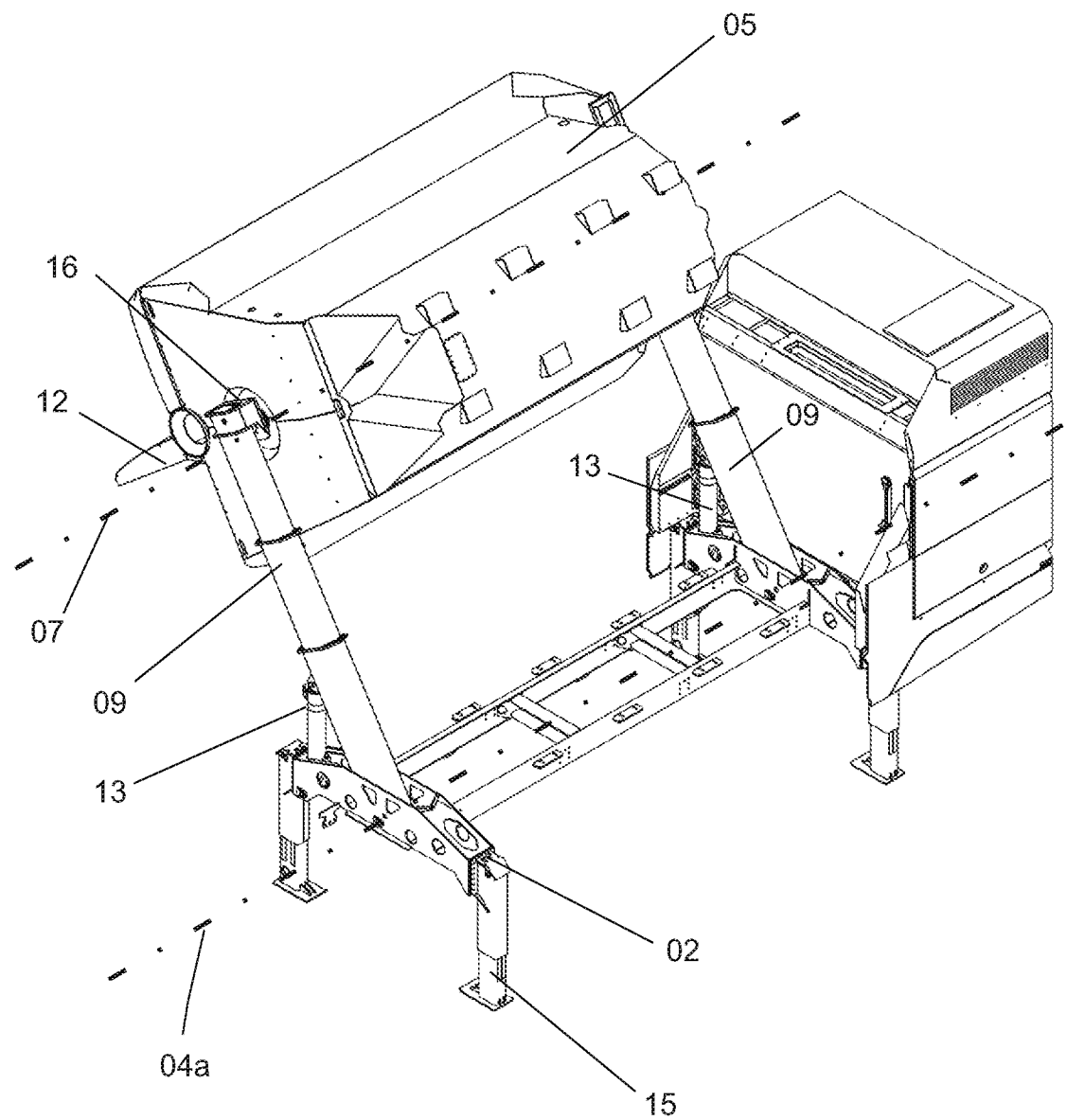
FIG. 2 shows a perspective view of an emptying module with the material collecting container tilted.

FIG. 2 shows a simplified perspective view of an emptying module, such as that which may be a component of the vehicle 01 described above. The chassis elements belonging to the vehicle 01 are mostly not shown in FIG. 2. Parts of the vehicle frame can be attributed directly to the vehicle and/or to the auxiliary frame of the independently constructed emptying module.

FIG. 2 shows the status of the emptying of the material collecting container 05. To do so, the telescope arms 09 are extended in the longitudinal direction and, after reaching a minimum height which permits pivoting, are pivoted to one of the two sides of the vehicle and/or sides of the module by activation of the pivot drive 13. In the example illustrated here, the material collecting container 05 has been pivoted to the left based on the direction of travel.

For secure positioning of the vehicle and/or the module during the emptying process, support 15 can be extended, so that the vehicle assumes the most horizontal possible position.

After axial extension of the telescope arms 09 and after pivoting, a rotary drive 16 is activated, said rotary drive being arranged in the region of the pivot bearing 08 and/or optionally integrated into it. The activation of the rotary drive 16 causes a rotation of the material collecting container 05 about the tilt axle 07, so that the top side 11 is inclined to the side, i.e., downward so that when the cover 12 is opened, the material collecting in the material collecting container 05 can be dumped out.

In a simplified view from the rear, FIG. 3 shows again the condition during the emptying of the material collecting container 05. It can seen quite well in this diagram that the tilt axle 07 is shifted so far upward, due to the extension of the telescope arms 09, that the edge of the top side 11, which is at the bottom when the material collecting container 05 is tilted may be located at a height of 2 meters to 3 meters, for example, so that emptying of the material collecting container 05 into a truck standing next to the vehicle is then possible. To do so, it is necessary for the cover 12 to be opened at least partially, preferably by pivoting one-half of the cover about a collapsible axle running approximately in the center line of the top side 11.

Figure 3:
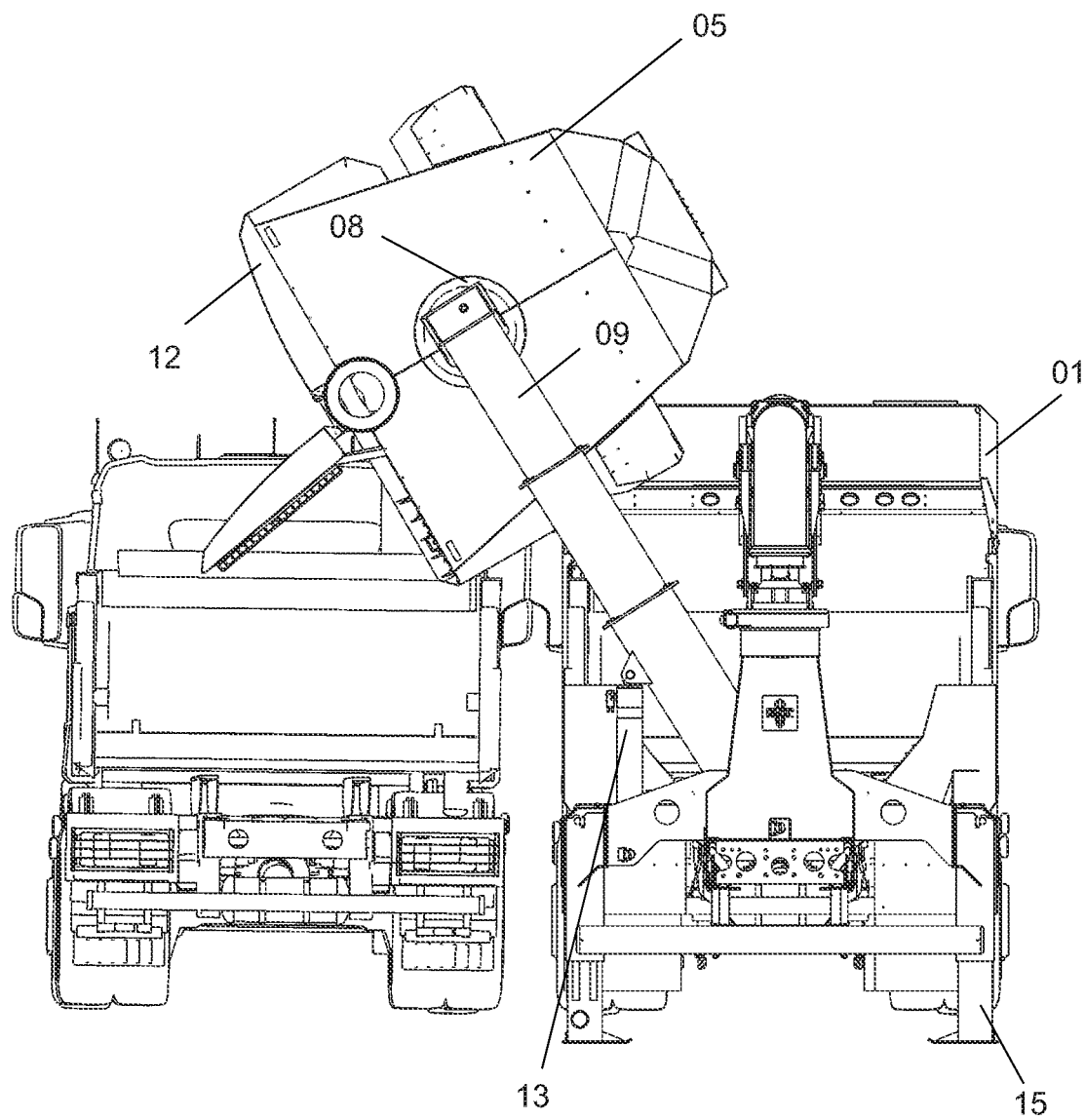
FIG. 3 shows a view of the vehicle from the rear during an emptying process.

It can also be seen from FIG. 3 that, due to the lateral pivoting of the telescope arms 09 with the help of the pivot drive 13, the tilt axle 07 runs at the left next to the vehicle and/or in the case of pivoting in the other direction, it may run at the right next to the vehicle 01. It is therefore possible to empty the material collecting container 05 on either the right or left side of the vehicle.

The telescope arms 09 are preferably equipped with an integrated linear guide and can be retracted and extracted by means of hydraulic cylinders in an essentially known manner. As a rule, a parallel operation of the two telescope arms by a corresponding control is possible, wherein extension of the two telescope arms to different extents may also be expedient in certain application situations.

To prevent torsion, a pivot drive 13 is preferably assigned to each one of the two telescope arms 09, as illustrated in FIG. 2. These two pivot drives 13 are also operated in synchronization. The aforementioned rotary drive 16 may be arranged on the container-side ends of the telescope arms 09 or only one of the telescope arms 09 may be equipped with the rotary drive while a journal bearing implements the rotary drive on the other telescope arm.

LIST OF REFERENCE NUMERALS

01 Vehicle
02 Vehicle frame/auxiliary frame
03 Vehicle wheels
04 Center plane of vehicle
04a Longitudinal axis of vehicle
05 Material collecting container
06 Suction connection
07 Tiltaxle
08 Pivot bearing
09 Telescope arms
10 Pivot bearing
11 Top side
12 Cover
13 Pivot drive
14 Connection point
15 Support
16 Rotary drive

The invention claimed is:

1. A vehicle, comprising
a vehicle frame wherein a longitudinal axis of the vehicle runs through a a central plane of the vehicle;
a tiltable material collecting container which is suspended on a tilt axle running parallel to the longitudinal axis of the vehicle; and
a telescoping device with two telescope arms each of whose container-side ends is arranged on the tilt axle about which the material collecting container can be rotated and each of whose frame-side ends is arranged on the vehicle frame; wherein
the tilt axle runs parallel to a plane of symmetry of the tiltable material collecting container, wherein a lateral offset relative to the plane of symmetry of the tiltable material collecting container amounts to less than ⅛ of the width of the tiltable material collecting container;
the frame-side ends of the telescope arms in the center plane of the vehicle are pivotably attached to the vehicle frame with a lateral offset relative to the frame amounting to less ⅛ of the width of the material collecting container;
at least one rotary drive is arranged on the container-side end of at least one telescope arm to enable a rotation of the tiltable material collecting container about the tilt axle; and
at least one pivot drive is provided, permitting pivoting of the telescope arms out of the central plane of the vehicle in both angular directions, wherein pivoting of the telescope arms is possible at least to the extent that the projected tilt axle runs outside of an area defined by the vehicle frame.

2. The vehicle according to claim 1, wherein the tilt axle runs through two rotary bearings in the plane of symmetry of the tiltable material collecting container, said rotary bearings being arranged on end walls of the material collecting container running transversely to the direction of travel.

3. The vehicle according to claim 2, wherein the two rotary bearings are arranged on the end walls of the tiltable material collecting container running transversely to the direction of travel in the region of the upper halves of the material collecting container.

4. The vehicle according to claim 3, wherein a rotary drive is arranged on each container-side end of the two telescope arms, wherein controllers of the two rotary drives are coupled to one another to ensure synchronized running of the rotary drives.

5. The vehicle according to claim 3, wherein the material collecting container has a multi part cover, wherein each cover part of the multi part cover is movably attached to a collapsible axle situated in the plane of symmetry of the material collecting container.

6. The vehicle according to claim 3, wherein the vehicle comprises a suction dredge and wherein the tiltable material collecting container serves as a container for material supplied over a suction connection as a component of a suction stream.

7. The vehicle according to claim 2, wherein a rotary drive is arranged on each container-side end of the two telescope arms, wherein controllers of the two rotary drives are coupled to one another to ensure synchronized running of the rotary drives.

8. The vehicle according to claim 2, wherein the material collecting container has a multi part cover, wherein each cover part of the multi part cover is movably attached to a collapsible axle situated in the plane of symmetry of the material collecting container.

9. The vehicle according to claim 1, wherein a rotary drive is arranged on each container-side end of the two telescope arms, wherein controllers of the two rotary drives are coupled to one another to ensure synchronized running of the rotary drives.

10. The vehicle according to claim 9, wherein the material collecting container has a multi part cover, wherein each cover part of the multi part cover is movably attached to a collapsible axle situated in the plane of symmetry of the material collecting container.

11. The vehicle according to claim 1, wherein the at least one pivot drive is formed by at least one hydraulic cylinder which runs at an acute angle between the vehicle frame and a section of the telescope arms that is not variable in length.

12. The vehicle according to claim 11, wherein the material collecting container has a multi part cover, wherein each cover part of the multi part cover is movably attached to a collapsible axle situated in the plane of symmetry of the material collecting container.

13. The vehicle according to claim 1, wherein the material collecting container has a multipart cover, wherein each cover part of the multipart cover is movably attached to a collapsible axle situated in the plane of symmetry of the material collecting container.

14. The vehicle according to claim 13, wherein the vehicle comprises a suction dredge and wherein the tiltable material collecting container serves as a container for material supplied over a suction connection as a component of a suction stream.

15. The vehicle according to claim 1, wherein the difference in the lengths of the telescope arms between completely retracted and completely extended states corresponds to at least ¼ of the height of the material collecting container.

16. The vehicle according to claim 1, wherein the vehicle comprises a suction dredge and wherein the tiltable material collecting container serves as a container for material which is supplied over a suction connection as a component of a suction stream.

17. The vehicle according to claim 1, wherein the vehicle comprises a suction dredge and wherein the tiltable material collecting container serves as a container for material supplied over a suction connection as a component of a suction stream.

18. An emptying module, comprising a frame having a central plane in which a longitudinal axis extends;

a tiltable material collecting container which is suspended in a tilt axle running parallel to the longitudinal axis; and a telescoping device having two telescope arms each having container-side ends arranged on the tilt axle about which the tiltable material collecting container can be rotated and each having frame-side ends arranged on the frame; wherein the tilt axle runs parallel to a plane of symmetry of the tiltable material collecting container, wherein a lateral offset relative to the plane of symmetry amounts to less than $1/8$ of the tiltable width of the material collecting container;

the frame-side ends of the telescope arms are pivotably attached to the frame in the central plane or with a lateral offset thereto of less than $1/8$ of the width of the material collecting container;

at least one rotary drive is arranged on the container-side end of at least one telescope arm to enable rotation of the material collecting container about the tilt axle; and at least one pivot drive which enables pivoting of the telescope arms out of the central plane in both angular directions is provided, wherein pivoting of the telescope arms is possible at least to the extent that the projected tilt axle runs outside of an area defined by the frame.

19. The emptying module according to claim 18, wherein the module is configured such that it is mountable on a vehicle.

* * * * *